United States Patent [19]

Usuda

[11] Patent Number: 5,469,539
[45] Date of Patent: Nov. 21, 1995

[54] METHOD FOR ABSTRACTING/DETAILING STRUCTURING ELEMENTS OF SYSTEM SPECIFICATION INFORMATION

[75] Inventor: Yutaka Usuda, Yokohama, Japan

[73] Assignee: Hitachi Software Engineering Co., Ltd., Kanagawa, Japan

[21] Appl. No.: 120,458

[22] Filed: Sep. 14, 1993

[30] Foreign Application Priority Data

Sep. 18, 1992 [JP] Japan .................................. 4-249909

[51] Int. Cl.[6] .................................................. G06T 11/60
[52] U.S. Cl. ........................ 395/155; 395/140; 395/161
[58] Field of Search ................................... 395/155, 161, 395/160, 159, 140, 133, 134; 345/118

[56] References Cited

U.S. PATENT DOCUMENTS

| 4,953,106 | 8/1990 | Gansner et al. | 395/160 |
| 4,954,969 | 9/1990 | Tsumura | 395/160 |
| 5,065,347 | 11/1991 | Pajak et al. | 395/159 |
| 5,276,789 | 1/1994 | Besaw et al. | 395/140 |
| 5,276,791 | 1/1994 | Palmer | 395/161 X |
| 5,278,951 | 1/1994 | Camacho et al. | 395/140 |

FOREIGN PATENT DOCUMENTS 1-116729 5/1989 Japan .
1-306922 12/1989 Japan .

OTHER PUBLICATIONS

Nikkei Byte, Apr. 1991, "A New Face for a User Interface: A Figure of Two Big OS's for Pen Input", pp. 233–239.
Structured Analysis and System Specification, 1978, T. DeMarco, pp. 257–271.

*Primary Examiner*—Raymond J. Bayerl
*Assistant Examiner*—Crescelle N. dela Torre
*Attorney, Agent, or Firm*—Fay, Sharpe, Beall, Fagan, Minnich & McKee

[57] ABSTRACT

The specification abstracting-detailing system stores system specification information in a hierarchical structure. A hierarchy operation selects an object to be detailed or abstracted from the specification information, for updating hierarchical information of a hierarchy between specification information of the hierarchy in such a state that a logical relation of the specification information contained in the hierarchy of the object selected, and for creating or deleting a new hierarchy. This allows the abstracting and detailing to be performed in the course of a natural thinking process by a designer.

1 Claim, 11 Drawing Sheets

FIG. 4

400 HIERARCHY MANAGEMENT TABLE

| PARENT HIERARCHIES (401) | CHILD HIERARCHIES (402) |
|---|---|
| A | B , C |
| B | — |
| C | W , Z , D |
| D | X , Y |
| ⋮ | ⋮ |

403c, 403d

410 STRUCTURING-INFORMATION MANAGEMENT TABLE

410c

| RELATION NAME (411) | STRUCTURING INFORMATION (412) |
|---|---|
| FLOW-f | UPPER LEVEL → PROCESS W |
| FLOW-g | PROCESS W → PROCESS D |
| FLOW-j | PROCESS D → PROCESS Z |
| FLOW-k | PROCESS Z → UPPER LEVEL |

410d

| RELATION NAME (411) | STRUCTURING INFORMATION (412) |
|---|---|
| FLOW-g | UPPER LEVEL → PROCESS X |
| FLOW-h | PROCESS X → DATA STORE S |
| FLOW-i | DATA STORE S → PROCESS Y |
| FLOW-j | PROCESS Y → UPPER LEVEL |

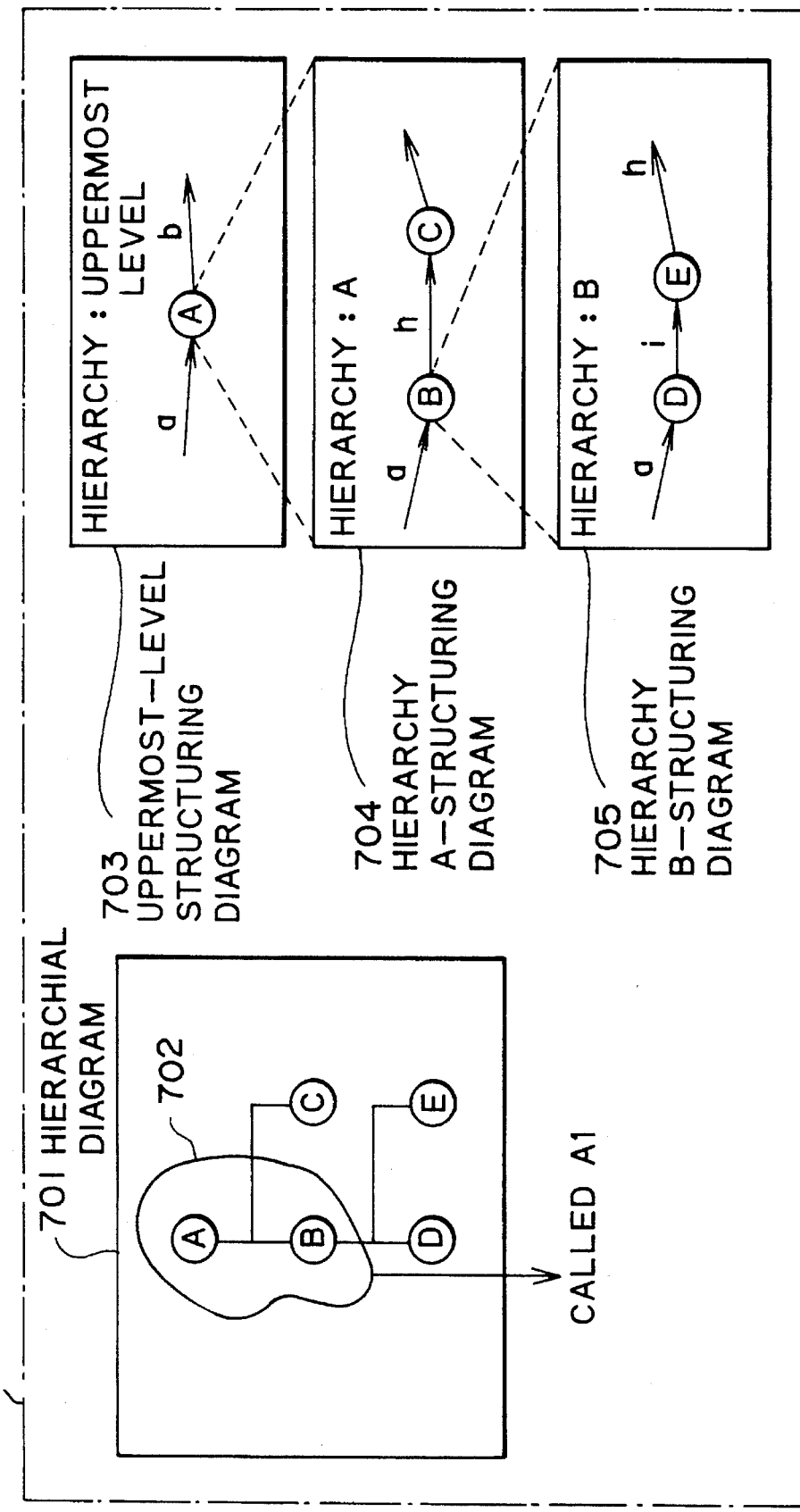
FIG.7(a) HIERARCHIAL DIAGRAM BEFORE MERGING

METHOD FOR ABSTRACTING/DETAILING STRUCTURING ELEMENTS OF SYSTEM SPECIFICATION INFORMATION

BACKGROUND OF THE INVENTION

1. Field of the Invention

The present invention relates to a specification abstracting-detailing system for use in a specification creation business of a system represented by a hierarchical structure and a logical relation in a hierarchy of the hierarchical structure.

2. Description of the Related Art

Generally, a specification of a complex system is described by representing a logical relation of system structuring elements in a hierarchical fashion. For example, in analyzing a flow of data of client business on the basis of a data flow diagram and a business hierarchical diagram or in describing processes of a large-scaled program, a process design may be performed on the basis of a flowchart or a PAD diagram and a module hierarchical diagram.

A system for supporting the detailing of a program is disclosed, for example, in Japanese Patent Unexamined Publication (kokai) No. 1-306,922, which involves supporting work for detailing a program in a hierarchical manner by providing an edit means for editing a graphic sign in a program structure diagram and detailing information corresponding to the graphic sign. This system can display a region for describing the detailing information for the graphic sign upon a request from a user and allow necessary information to be written in the region.

This system is arranged to detail the program in a hierarchical manner in the top-down order from an upper level to a lower level in designing a logic of the program.

Further, for example, Japanese Patent Unexamined Publication (kokai) No. 1-116,729 discloses a system for managing a multi-dimensional hierarchical structure among modules as a space model. This system can provide an editor capable of displaying and editing in a three-dimensional manner, a class hierarchy to be employed for detailing modules for each version, concealing information and orienting an object. This system relates the information on the information concealment or on the class hierarchy with a module detailed hierarchically in the top-down order from the upper level to the lower level in designing the logic of the program.

On the other hand, the fact in actual designing work is that information is not detailed reasonably and systematically in a top-down fashion from the uppermost hierarchy to the lowest hierarchy. For example, a structured analysis technique (T. DeMarco: Structured Analysis And System Specification, 1978, pp. 257–271, 1978, Prentice-Hall; translated by Takanashi And Kuroda, Nikkei-McGraw Hill, 1986, pp. 244–257) involves the procedures defining one hierarchy by enclosing a change region with a free curved line and dividing its detail in creating a future logical model at the time of completion of a new system from a current logical model describing current business. Further, in reviewing a boundary between manual work and automated work in the new system, the structured analysis technique likewise sets a boundary of automated work by using a free curved line in reviewing alternatives on the basis of cost analysis.

These methods indicate one example in which work for designing an actual system analysis is not conducted in the order from an upper level to a lower level. Further, no system capable of supporting such work mechanically is developed yet.

The procedure of work to be conducted by a designer in reviewing the specification of a system is arranged in such a manner that information on the specification of a middle-level hierarchy or of a lower-level hierarchy is first described as a memorandum so as to grasp a specific image for the specification of the system because an upper-level hierarchy is of an abstract type. In this case, the procedure further involves abstracting structuring elements of a hierarchy for creating a new hierarchy by grouping part of the specification information and detailing for replacement of an abstract hierarchy with a more specific description and, if needed, for example, by adding, deleting or correcting the structuring elements.

Repetition of trials and errors results in representation of a complex system in a top-down hierarchical structure and the course of creating the hierarchical structure is not executed whatsoever in a top-down fashion. Hence, the conventional techniques allows the specification to be used for the first time when the specification can be represented in a top-down fashion, and the specification cannot be used until it is represented in a definite way. Hence, the designer repeats trials and errors by writing various ideas on sheets of paper with a pencil or the like until then.

Further, the conventional techniques suffer from the disadvantage that progress and a quality of designing work depend heavily on an individual designer and they cannot be assessed systematically.

SUMMARY OF THE INVENTION

The object of the present invention is to provide a specification abstracting-detailing system so adapted as to abstract and detail a specification in a course of natural thinking by a designer.

Another object of the present invention is to provide a specification abstracting-detailing system that allows progress of designing work and a quality of work to be assessed in a systematic way.

In order to achieve the objects as described hereinabove, the present invention consists of a specification abstracting-detailing system for abstracting or detailing information of a specification, comprising:

a storage means for storing information of a system specification information in a hierarchical structure; and a hierarchy operating means for selecting an object to be detailed or abstracted from the specification information stored in the storage means, for updating hierarchical information between specification information of the hierarchy in such a state that a logical relation of the specification information contained in the hierarchy of the object selected, and for creating or deleting a new hierarchy.

Further, the specification abstracting-detailing system according to the present invention is so adapted as to record an operation history at every operation of the hierarchical structure between the specification information.

The arrangement of the means as described hereinabove allows the designer to abstract or detail the specification in the course of natural thinking because, when the object to be detailed or abstracted is selected from the system specification information in the hierarchical structure, the hierarchical information between the specification information of the hierarchy is updated in the state in which the logical relation of the specification information contained in the hierarchy of the selected object is retained and the new hierarchy is created or deleted.

By recording the operation history at every operation of the hierarchical structure between the specification information, the progress and the quality of the designing work can be assessed systematically.

Other objects, features and advantages of the present invention will become apparent in the course of the description of the preferred embodiments, which follows, with reference to the accompanying drawings.

BRIEF DESCRIPTION OF THE DRAWINGS

FIG. 4 is a schematic representation showing the internal structure of a logical data storing section.

FIGS. 7(a) and 7(b) are each a schematic representation showing an operation for merging hierarchies.

DESCRIPTION OF THE PREFERRED EMBODIMENTS

The present invention will be described more in detail by way of examples with reference to the accompanying drawings.

Figure 1:
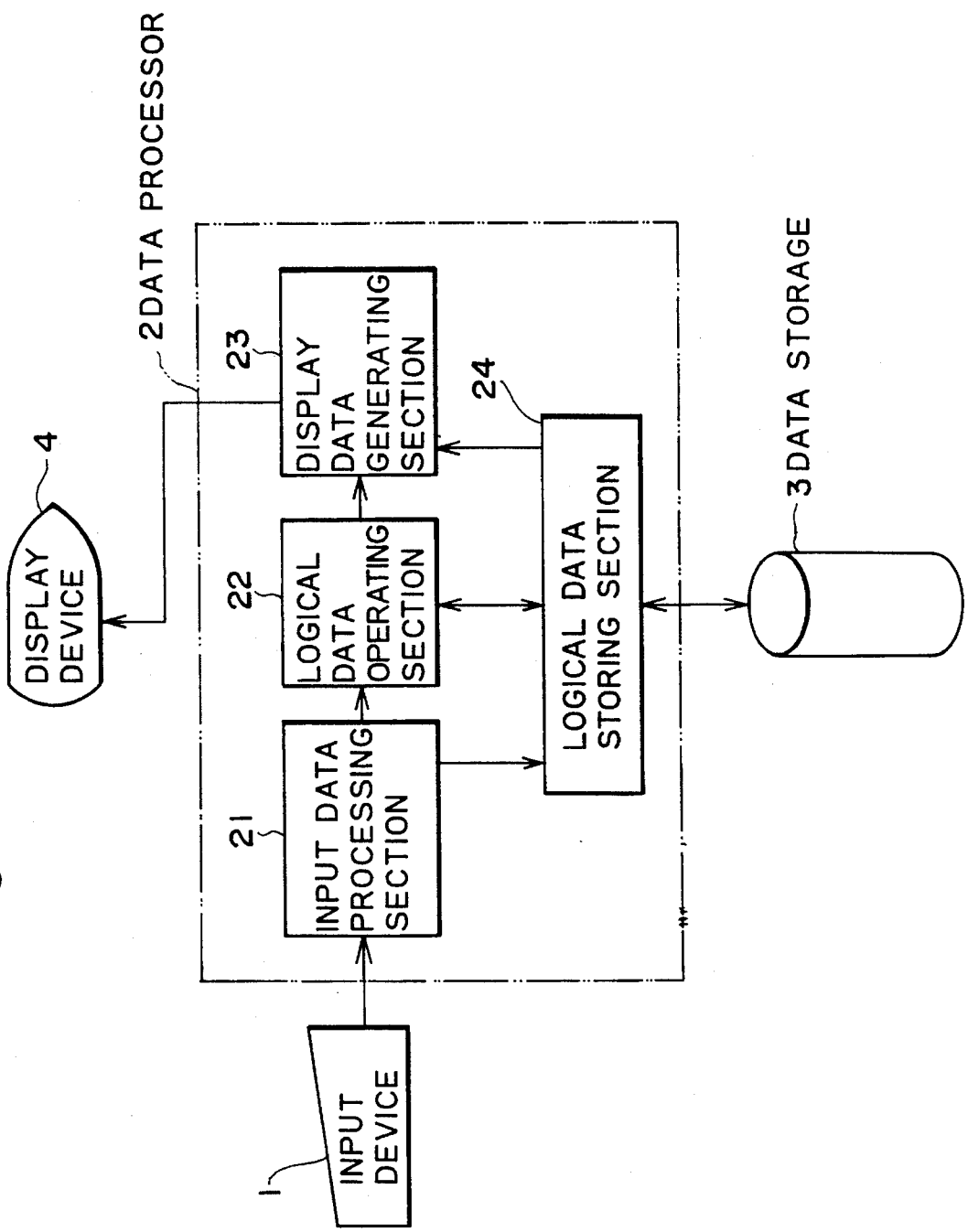
FIG. 1 is a block diagram showing an embodiment of a data processing system to which the system according to the present invention is applied.

FIG. 1 shows an embodiment of the data processing system to which the specification abstracting-detailing system according to the present invention is applied. In FIG. 1, reference numeral 1 denotes an input device, reference numeral 2 denotes a data processor, reference numeral 3 denotes a data storage, and reference numeral 4 denotes a display device.

The data processor 2 comprises an input data processing section 21, a logical data operating section 22, a display data generating section 23, and a logical data storing section 24.

Figure 2:
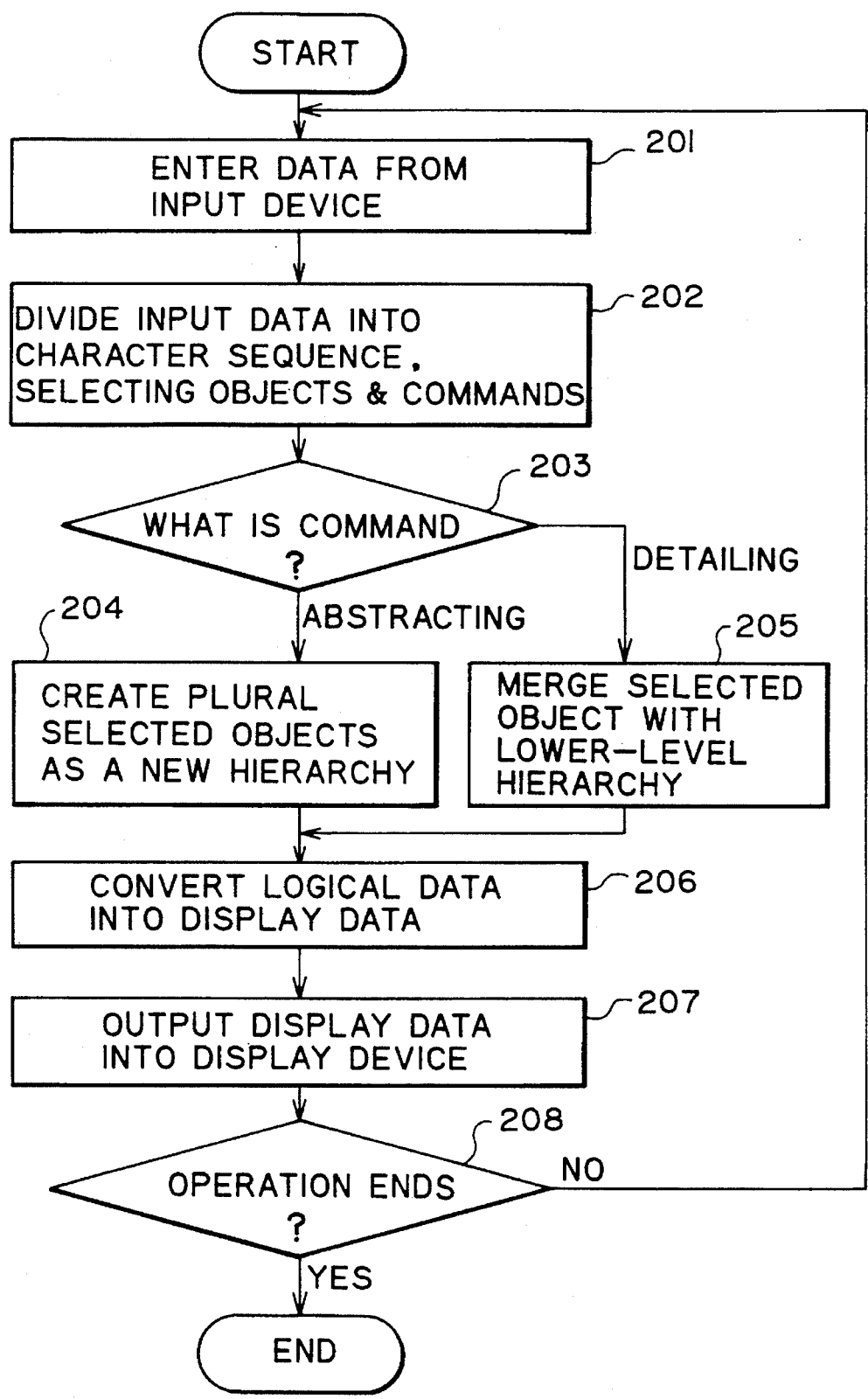
FIG. 2 is a flow chart showing a procedure of processing with a data processor.

FIG. 2 shows the flow chart showing a procedure of processing with the data processor 2.

In FIG. 2, data is entered from the input device 1 at step 201, followed by proceeding to step 202 at which the input data is divided into character sequences, objects to be selected, and commands. Then, at step 203, it is decided to determine if the command exists which requires to detail or abstract the specification. When it is decided at step 203 that the command for abstracting exists, on the one hand, then the program flow goes to step 204 at which a new hierarchy is created for the selected plural objects. When it is decided at step 203 that the command for detailing exists, on the other hand, the program flow goes to step 205 at which the selected object is merged with its lower level hierarchy and then proceeding to step 206 at which the operated logical data is converted into the display data. Then, at step 207, the display data is outputted into the display device 4, followed by proceeding to step 208 at which it is decided to determine if the operation ends. While the operation does not end, the program flow returns to step 201. When the operation ends, the processing is finished.

Figure 3A:
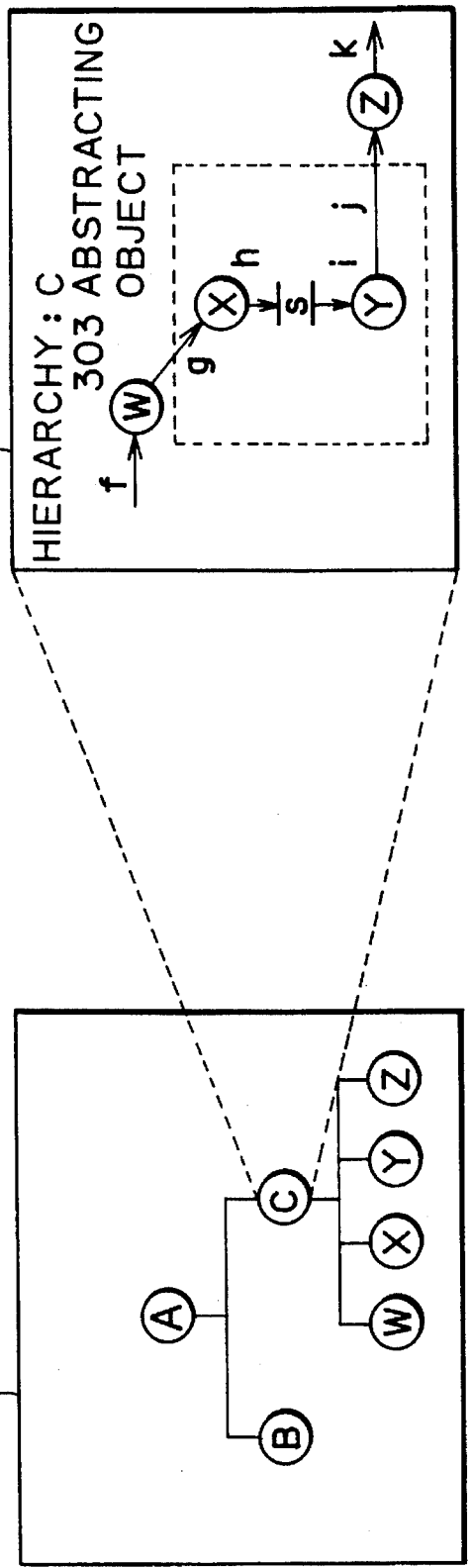
FIGS. 3(a) and 3(b) are each a schematic representation showing an example of an operation for abstracting and detailing.
Figure 3B:
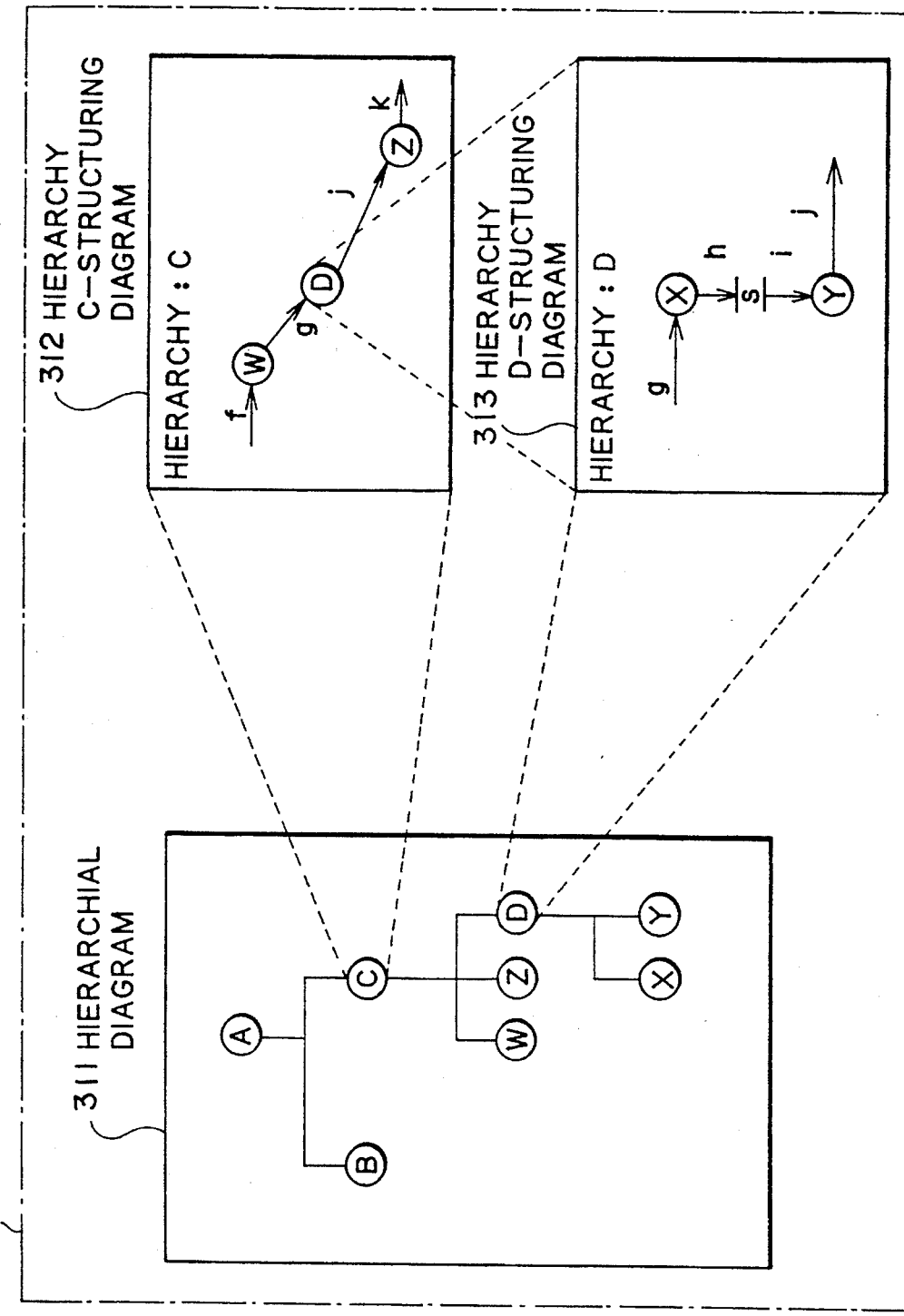

FIGS. 3(a) and 3(b) are each a data flow diagram and a hierarchical diagram showing an example of an operation for abstracting and detailing. In addition to the data flow diagram, there may be used for this purpose any diagram capable of having a hierarchical structure, such as a flow chart, a PAD diagram, an ER diagram, a business flow, and so on, and there is no limitation of techniques for describing the specification. Further, the type of representing the structuring element in the technique is not restricted to a particular one such as a graphic image, text, icon or the like.

The operation for abstracting is implemented in a way as will be described hereinafter. In a state 300 before abstracting, structuring elements (flows g, h, i and j, processes X and Y as well as a data store s) existing in a scope enclosed with broken line, as indicated by reference numeral 303, are selected, as an object to be abstracted, from a hierarchy C-structuring diagram 302 (a data flow diagram in this embodiment) for structuring the hierarchy C contained in a hierarchical diagram 301. The selected structuring elements are then processed with the data processor 2 and a new hierarchy D is inserted into a level subordinate to the hierarchy C in the resulting abstracted state 310 and the hierarchy D is contained in the hierarchy C-structuring diagram 312, and the structuring elements selected as the abstracting object 303 are transferred to a hierarchy D-structuring diagram 313. The names of new hierarchies can be provided arbitrarily by the user or automatically with the data processor 2.

On the other hand, the operation for detailing is implemented in the way opposite to the operation for abstracting in the manner as described hereinabove.

More specifically, when the hierarchy D is selected as a detailing object from the hierarchy C-structuring diagram 312, the hierarchy D is deleted from the hierarchy C-structuring diagram 312, and the hierarchy D selected from the hierarchy C-structuring diagram 312 is replaced in order to achieve the logical relationship as described in the hierarchy D-structuring diagram 312.

The operation history is recorded in the data storage 3 and the progress and the quality of the designing work is assessed in a quantitative way by analyzing the frequency and the locality of edit work, the standard deviation of the number of the structuring elements in the hierarchies, the ratio of the abstracting work to the detailing work, the number of violation of designing rules, and so on.

FIG. 4 illustrates the status in which the abstracted state 310 is stored in the logical data storing section 24. A hierarchy management table 400 stores a group of child hierarchies 402 for a parent hierarchy 401, and a structuring information management table 410 corresponds the structuring information to the parent hierarchy 401 having the structuring information in the hierarchy of the hierarchy management table 400 on the basis of a relation name 411 and the structuring information 412. More specifically, the parent hierarchy C (403c) corresponds to a structuring information management table 410c and the parent hierarchy D (403d) corresponds to a structuring information management table 410d.

Figure 5A:
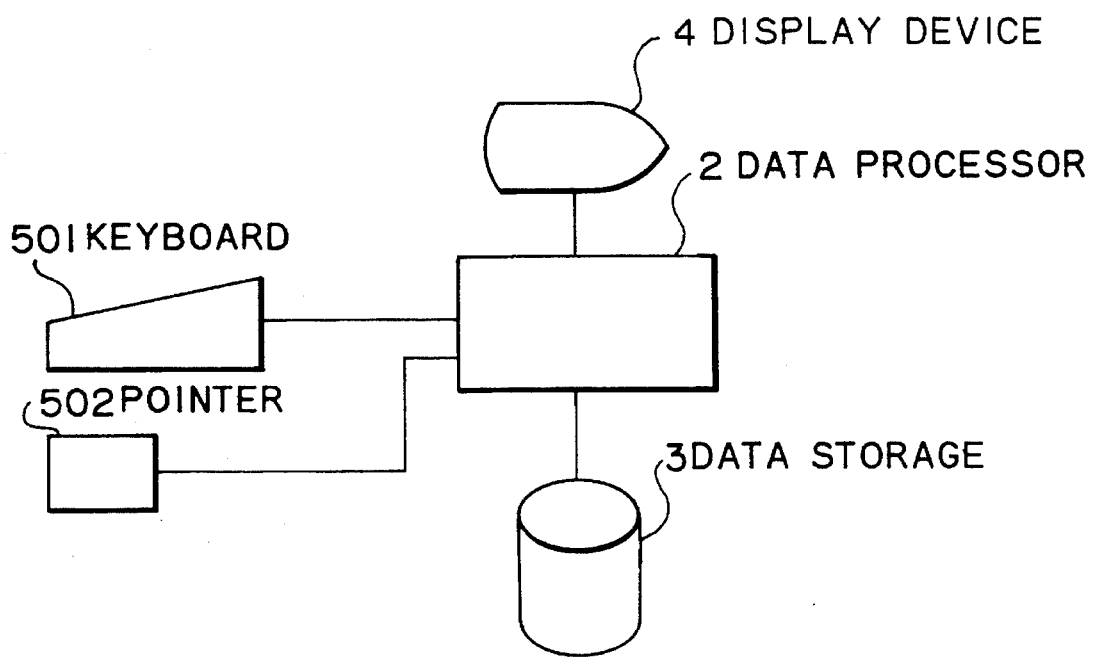
FIGS. 5(a) and 5(b) are each a block diagram showing another embodiment of a data processing system to which the system according to the present invention is applied.
Figure 5B:
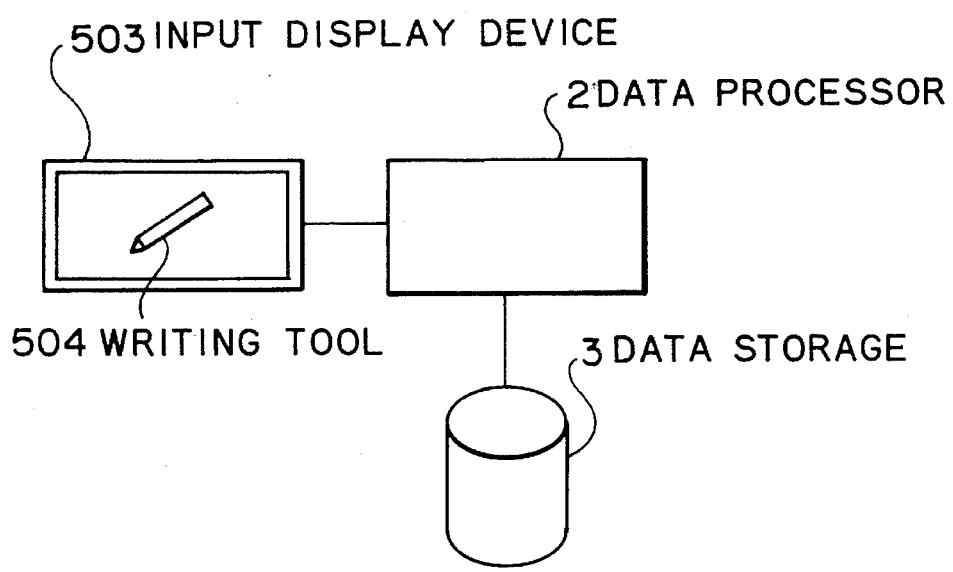

FIGS. 5(a) and 5(b) show another embodiment of the system configuration comprising, respectively, an example in which the input device 1 is comprised of a keyboard 501 and a pointer 502 and an example in which input is entered with a writing tool 504 into the input display device 503 having the input device 1 and the display device 4 integrated with each other.

The pointer 502 is disposed separately from the keyboard 501 and it may include, for example, a mouse, a joystick, a trackball or any other pointing device capable of selecting and giving an instruction to the data processor 2.

The writing tool 504 is one capable of detecting and displaying its locus on the input display device 503 and it may include, for example, an electronic pen, a pencil, a finger and any other writing tool.

The writing tool 504 allows all operations to be realized with only one writing tool, in combination with an edit operation by drawing a picture or by taking advantage of a gesture ("A New Face For A User Interface: A Figure of Two Big OS's for Pen Input; Nikkei Byte, 1991 April, pp. 233–239), in addition of the selection of the object.

Figure 6:
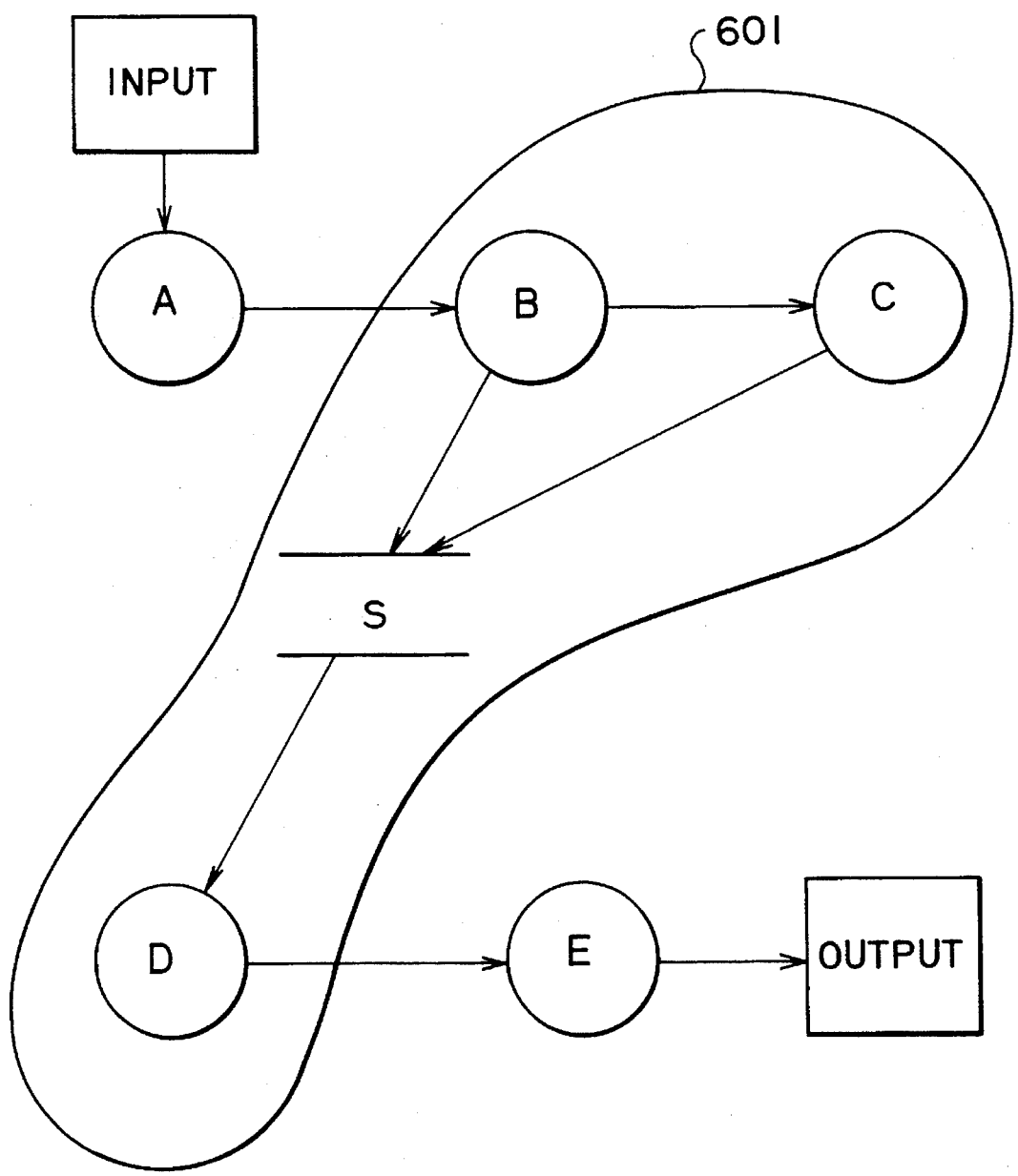
FIG. 6 is a schematic representation showing an example of selecting an object by taking advantage of a free curved line.

FIG. 6 shows an example of selecting the object by enclosing the structuring element with a free curved line 601 written with the pointer 502 or the writing tool 504.

Figure 7B:
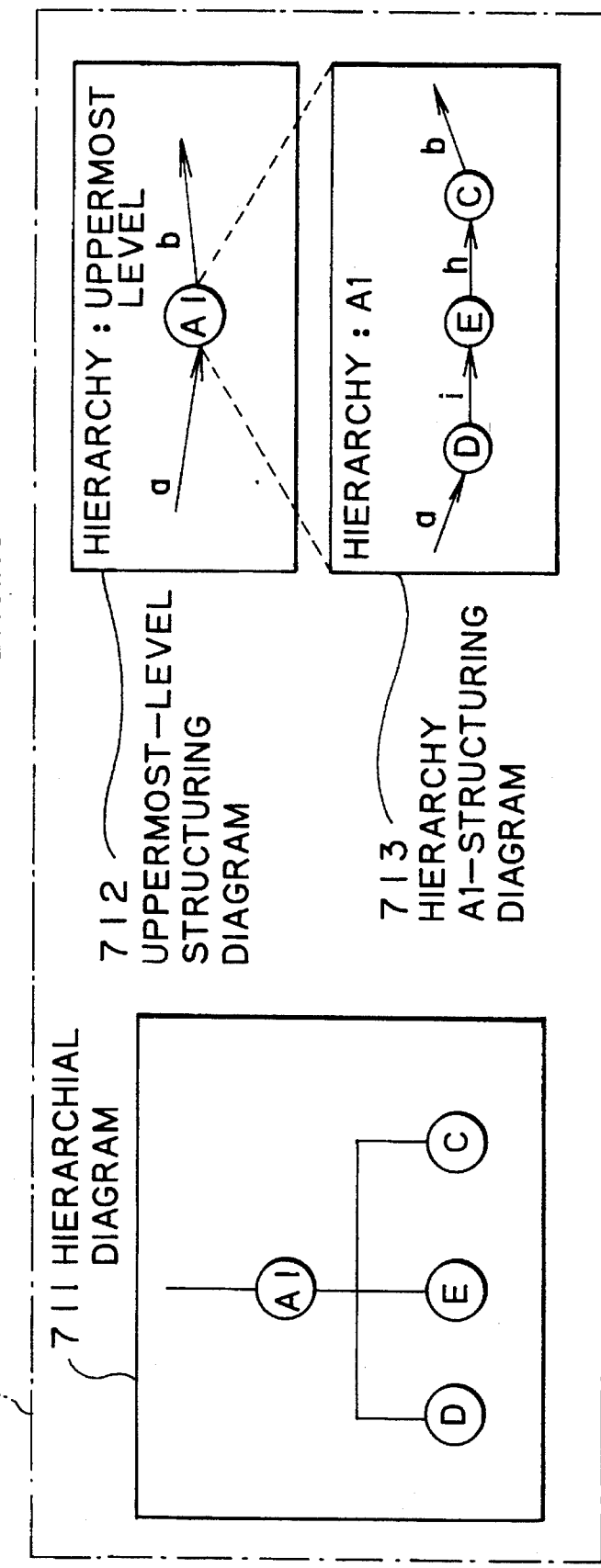

FIGS. 7(a) and 7(b) show an example of implementing an operation for merging hierarchical diagrams as a variation of the detailing work.

In FIG. 7(a), a hierarchical diagram 700 before merging contains a hierarchical diagram 701 from which a hierarchy A and a hierarchy B are selected as a merging object 702 by enclosing the hierarchies A and B with line written by the pointer 502 or the writing tool 504. The selected hierarchies A and B are grouped into a new hierarchy A1 that in turn is created in a hierarchical diagram 711 of a hierarchical diagram 710 after merging, in place of the hierarchies A and B.

This process allows the new hierarchy A1 to exist in the uppermost structuring diagram 712 and its detailing information is described in a hierarchy A1-structuring diagram 713. The hierarchies A and B are caused to disappear from the merged hierarchical diagram 711. It should be noted herein that the hierarchy A is not always the uppermost hierarchy in this hierarchical diagram.

Figure 8A:
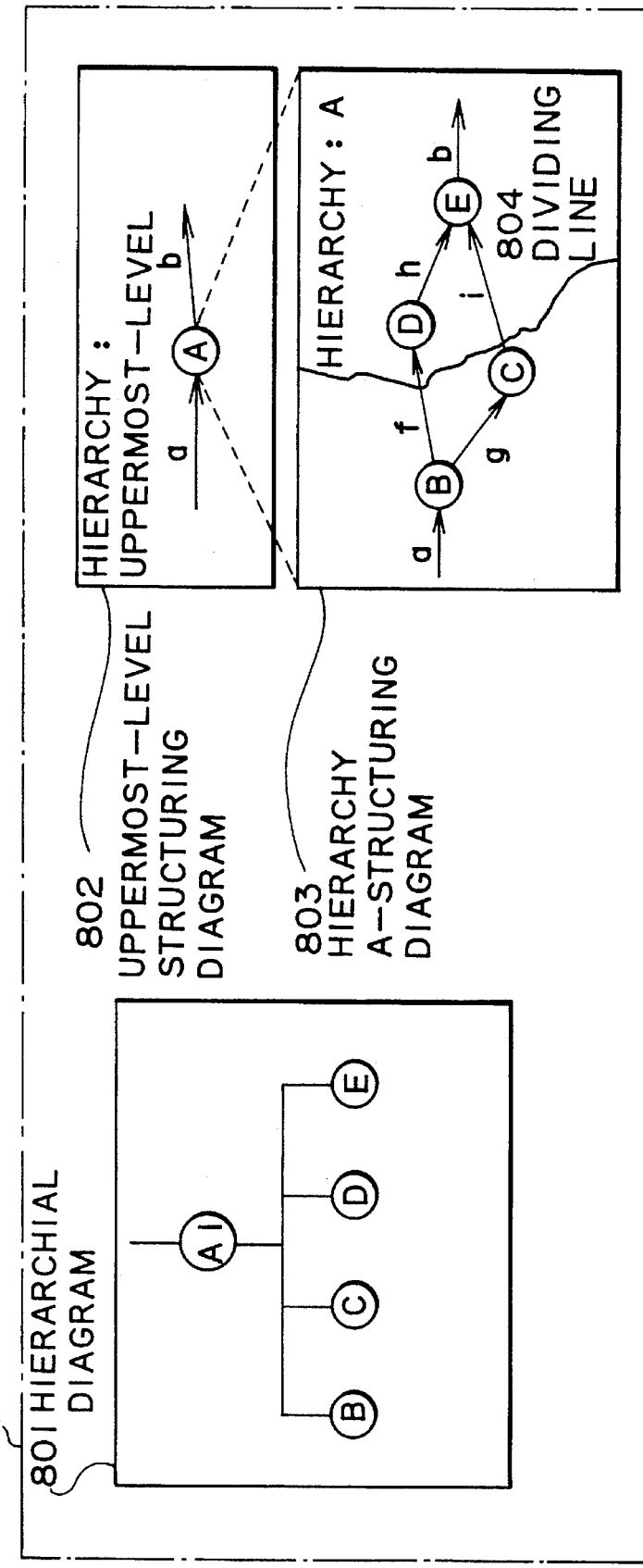
FIGS. 8(b) and 8(b) are each is a schematic representation showing an example of dividing a structuring diagram.
Figure 8B:
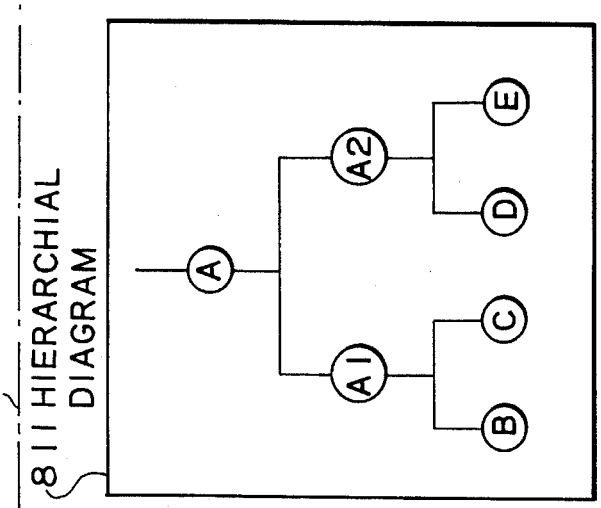

FIGS. 8(a) and 8(b) show an example of dividing the structuring diagram as a variation after the abstracting operation. In a structuring diagram 800 before dividing, a structuring diagram 803 for the uppermost hierarchy A in the uppermost hierarchical diagram 802 is divided with a line 804 into two hierarchies A1 and A2. This dividing operation allows the hierarchies A1 and A2 to be created in the level subordinate to the hierarchy A in the hierarchical diagram 811 of a structuring diagram 810 after dividing, thereby allowing the hierarchies A1 and A2 to exist in the hierarchy A-structuring diagram 813, and the detailing information of each of the hierarchies A1 and A2 is described in newly added hierarchy A1-structuring diagram 814 and a hierarchy A2-structuring diagram 815, respectively.

It can be noted herein that the hierarchy A is not always the uppermost hierarchy in this hierarchical diagram and that the hierarchy A-structuring diagram 803 may be divided into three or more as well as into two.

In the embodiments as described hereinabove, once the object to be detailed or abstracted is selected for the system specification information of a hierarchical structure, the specification abstracting-detailing system according to the present invention can update the hierarchical information between the specification information of the hierarchy in such a state that the logical relation of the specification information contained in the hierarchy of the selected object is retained and create or delete a new hierarchy. Hence, the designer can abstract the specification in the course of natural thinking.

Further, the specification information can be corrected or modified by recording the operation history of operating the hierarchical structure between the specification information, so that the progress and the quality of the designing work can be evaluated in a systematical way.

In addition, the specification abstracting-detailing system according to the present invention can support edit work for editing the specification information by adding, deleting or updating necessary information, as needed, as well as by abstracting and detailing; hence, the specification abstracting-detailing system can make a support in a broad range from the time when the specification is not yet made definite to the time when the specification is made definite.

Furthermore, as the system according to the present invention can use the free curved line for selecting the object to be abstracted or detailed, the object can be selected with high flexibility.

The specification abstracting-detailing system according to the present invention can allow all operations for entering the specification, editing the specification, selecting the object and implementing other activities to be conducted only with the writing pen such as the electronic pen. Hence, the specification abstracting-detailing system can make a support with high simplicity in a broad range from the time when the specification is not yet made definite to the time when the specification is made definite, as if the user is writing a memorandum on paper with a pencil.

As described hereinabove, the specification abstracting-detailing system according to the present invention can support specification abstracting-detailing work in the course of natural thinking by the designer in describing the specification of a complex system because the specification abstracting-detailing system comprises the storage means for storing information of the system specification information in the hierarchical structure; and the hierarchy operation means for selecting the object to be detailed or abstracted from the specification information stored in the storage means, for updating hierarchical information of the hierarchy between specification information of the hierarchy in such a state that the logical relation of the specification information contained in the object selected, and for creating or deleting the new hierarchy.

Further, the specification abstracting-detailing system according to the present invention can record the operation history for each operation of the hierarchical structure between the specification information.

What is claimed is:

1. A method for abstracting/detailing structuring elements of system specification information, wherein specification information is represented by a hierarchical tree-structure having stories of structuring elements at various levels, the method comprising the steps of:

selecting a first structuring element which is to be subjected to an abstracting or detailing process, the first structuring element being at a first level;

selecting between an abstracting process and a detailing process;

performing, if an abstracting process is selected, the steps of shifting the first structuring element to a second level lower than the first level, creating a second structuring element representative of the first structuring element, and placing the second structuring element at the first level into a position vacated by the first structuring element; and performing, if a detailing process is selected, the steps of deleting the first structuring element, shifting a third structuring element, which is representative of the first structuring element and located at a second level lower than the first level, to the first level into a position vacated by the first structuring element.

* * * * *